United States Patent
Kanno

(10) Patent No.: US 9,811,462 B2
(45) Date of Patent: Nov. 7, 2017

(54) MEMORY SYSTEM EXECUTING GARBAGE COLLECTION

(71) Applicant: Toshiba Memory Corporation, Minato-ku, Tokyo (JP)

(72) Inventor: Shinichi Kanno, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/848,844

(22) Filed: Sep. 9, 2015

(65) Prior Publication Data

US 2016/0321171 A1 Nov. 3, 2016

Related U.S. Application Data

(60) Provisional application No. 62/155,249, filed on Apr. 30, 2015.

(51) Int. Cl.
G06F 12/02 (2006.01)
G06F 3/06 (2006.01)

(52) U.S. Cl.
CPC ........ *G06F 12/0253* (2013.01); *G06F 3/0619* (2013.01); *G06F 3/0655* (2013.01); *G06F 3/0688* (2013.01); *G06F 12/0246* (2013.01); *G06F 2212/1016* (2013.01); *G06F 2212/7201* (2013.01); *G06F 2212/7205* (2013.01)

(58) Field of Classification Search
CPC .. G06F 12/0253; G06F 3/0688; G06F 3/0655; G06F 12/0246; G06F 3/0619; G06F 2212/7201; G06F 2212/7205; G06F 2212/1016

See application file for complete search history.

(56) References Cited

U.S. PATENT DOCUMENTS

| | | | | |
|---|---|---|---|---|
| 5,933,840 | A * | 8/1999 | Menon | G06F 3/0607 |
| 7,600,223 | B2 * | 10/2009 | Massarenti | G06F 9/4435 707/999.202 |
| 8,285,946 | B2 | 10/2012 | Eleftheriou et al. | |
| 2005/0235120 | A1 * | 10/2005 | Dussud | G06F 12/0276 711/159 |
| 2007/0033324 | A1 | 2/2007 | Sinclair | |
| 2011/0066808 | A1 * | 3/2011 | Flynn | G06F 12/0246 711/118 |

(Continued)

FOREIGN PATENT DOCUMENTS

JP 2013-513881 A 4/2013

*Primary Examiner* — Rocio Del Mar Perez-Velez
(74) *Attorney, Agent, or Firm* — White & Case LLP

(57) ABSTRACT

According to one embodiment, a memory system includes a nonvolatile memory, detection unit, management unit, selection unit, and garbage collection unit. The nonvolatile memory includes memory areas divided into units of execution of garbage collection. The detection unit detects a data amount of data written to a different memory area among the memory areas when the garbage collection is executed, for each of the memory areas. The management unit manages a threshold set for each of the memory areas. The selection unit selects, based on the data amount and the threshold for each of the memory areas, a memory area whose data amount is smaller than the threshold of the memory area. The garbage collection unit executes the garbage collection on the memory area selected by the selection unit.

7 Claims, 6 Drawing Sheets

(56) References Cited

U.S. PATENT DOCUMENTS

| | | | |
|---|---|---|---|
| 2011/0264843 A1* | 10/2011 | Haines | G06F 12/0246 711/103 |
| 2012/0072683 A1* | 3/2012 | Iliadis | G06F 12/0246 711/159 |
| 2012/0179928 A1* | 7/2012 | Haustein | G06F 1/3268 713/324 |
| 2012/0221784 A1* | 8/2012 | Ban | G06F 12/0246 711/103 |
| 2014/0032817 A1* | 1/2014 | Bux | G06F 12/0246 711/103 |
| 2014/0095775 A1 | 4/2014 | Talagala et al. | |
| 2015/0113206 A1* | 4/2015 | Fitzpatrick | G06F 12/0246 711/103 |
| 2015/0169442 A1* | 6/2015 | Fisher | G06F 12/0253 711/103 |
| 2016/0124848 A1* | 5/2016 | Bellorado | G06F 12/0253 711/103 |

\* cited by examiner

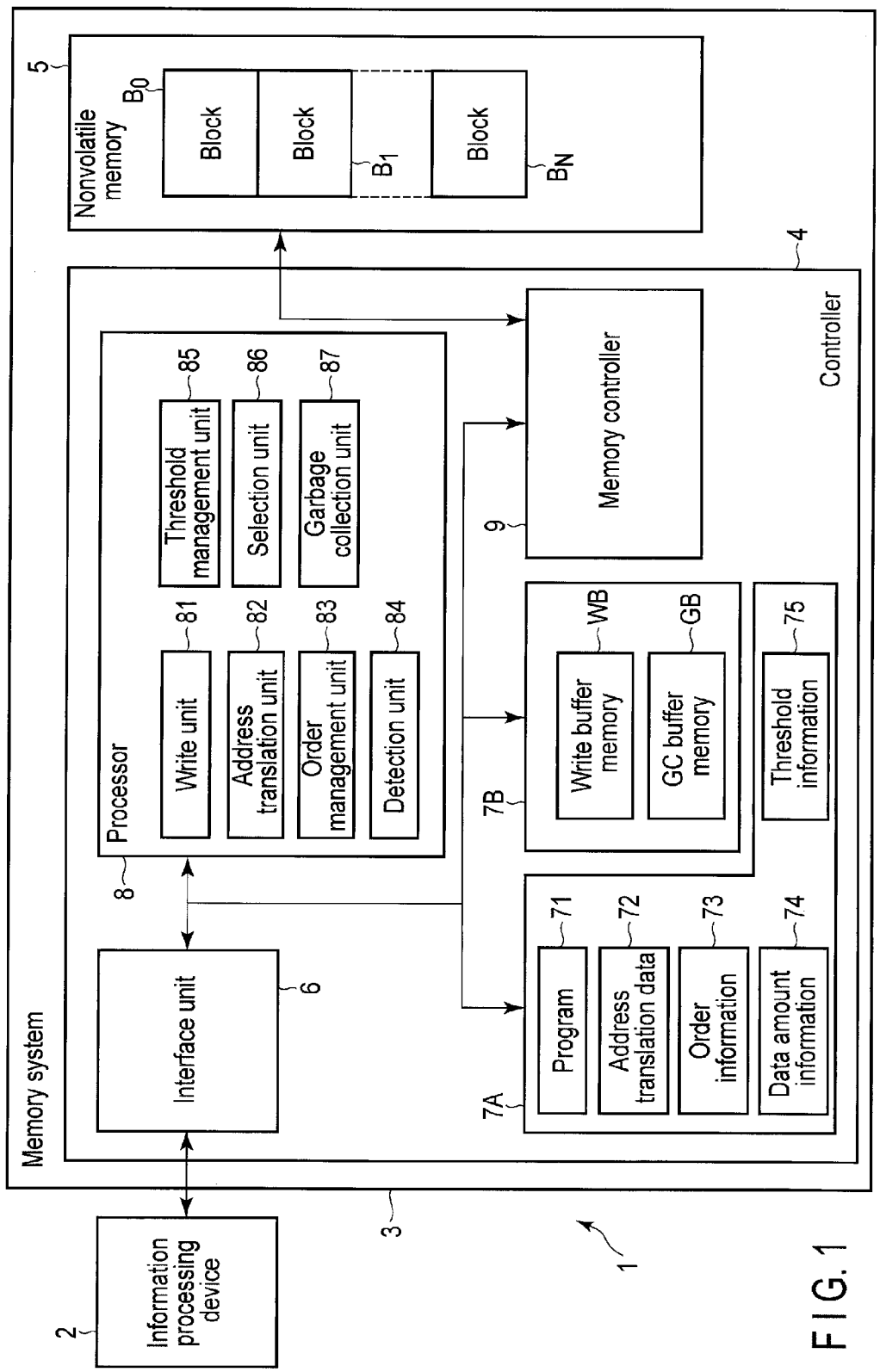
F I G. 1

| Identification information of block | Number |
|---|---|
| $B_0$ | $K$ |
| $B_1$ | $K+1$ |
| $B_2$ | $K+2$ |
| ⋮ | ⋮ |
| $B_N$ | $K+N$ |

FIG. 2

| Identification information of block | Valid data amount |
|---|---|
| $B_0$ | $Z_0$ |
| $B_1$ | $Z_1$ |
| $B_2$ | $Z_2$ |
| ⋮ | ⋮ |
| $B_N$ | $Z_N$ |

FIG. 3

| Identification information of block | Threshold |
|---|---|
| $B_0$ | $TH_0$ |
| $B_1$ | $TH_1$ |
| $B_2$ | $TH_2$ |
| ⋮ | ⋮ |
| $B_N$ | $TH_N$ |

FIG. 4

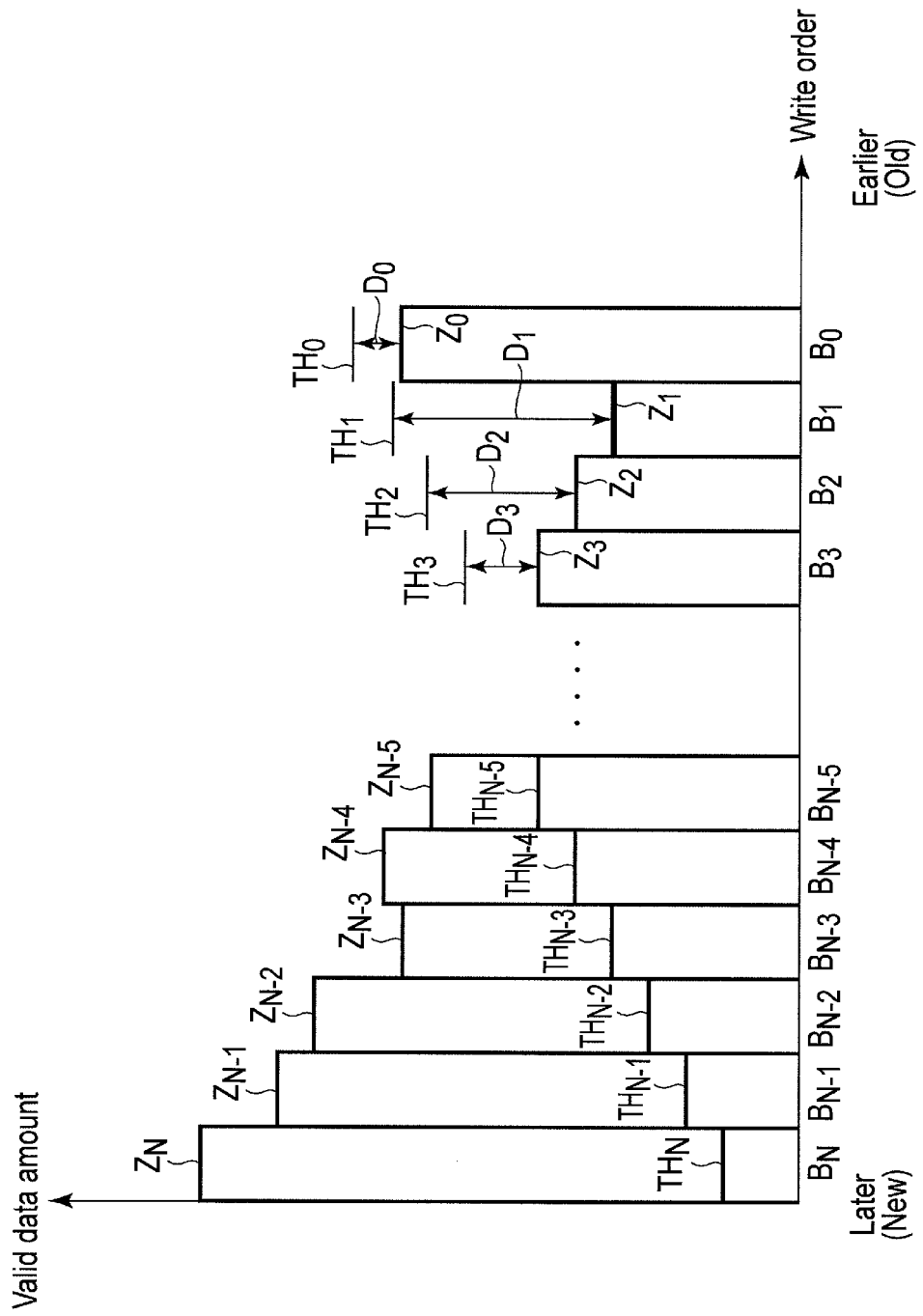
F I G. 5

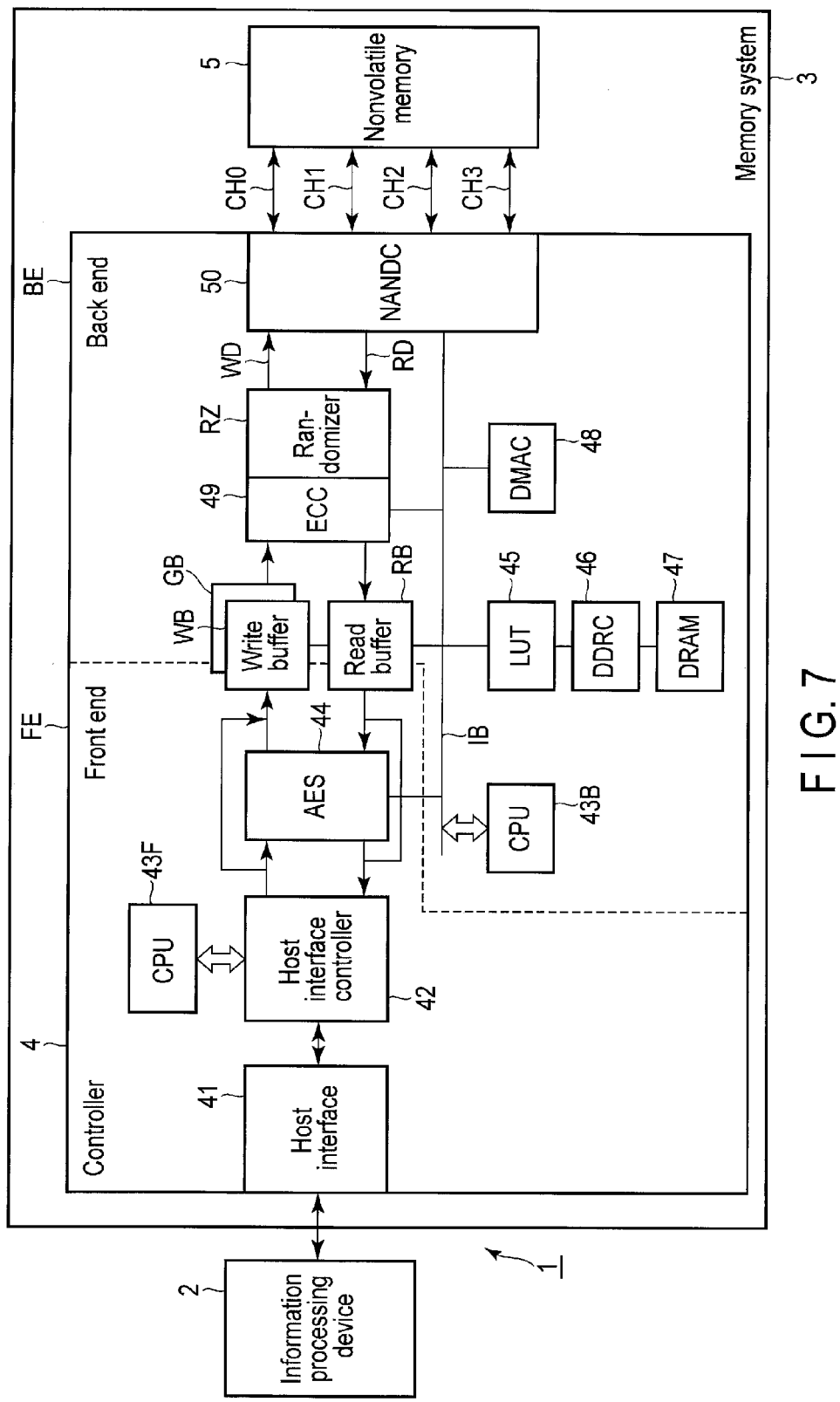
F I G. 7

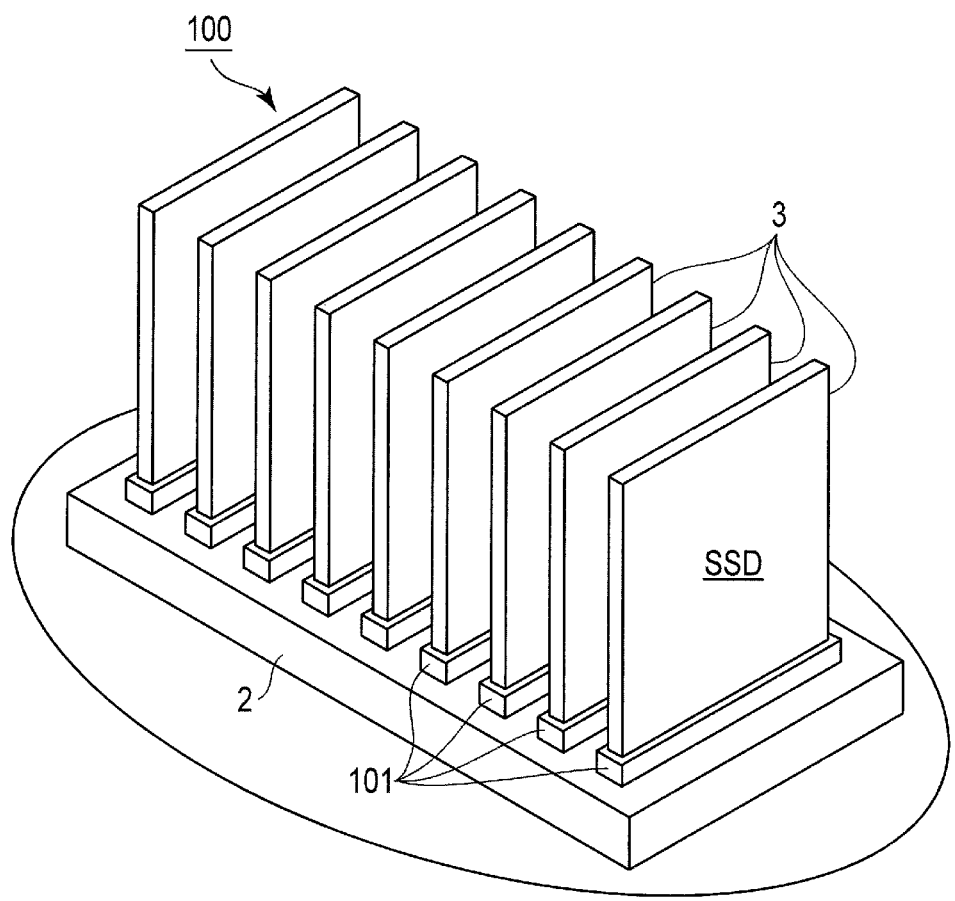
F I G. 8

US 9,811,462 B2

MEMORY SYSTEM EXECUTING GARBAGE COLLECTION

CROSS-REFERENCE TO RELATED APPLICATIONS

This application claims the benefit of U.S. Provisional Application No. 62/155,249, filed Apr. 30, 2015, the entire contents of which are incorporated herein by reference.

FIELD

Embodiments described herein relate generally to a memory system executing garbage collection.

BACKGROUND

A solid state drive (SSD) includes a nonvolatile semiconductor memory and has an interface which is similar to that of a hard disk drive (HDD). For example, at the time of data writing, the SSD receives a write command, logical block addressing (LBA) of a writing destination, and write data from an information processing device, translates the LBA into physical block addressing (PBA) based on a lookup table (LUT), and writes the write data to a position indicated by the PBA.

BRIEF DESCRIPTION OF THE DRAWINGS

FIG. 1 is a block diagram showing an example of a structure of an information processing system according to a first embodiment.

FIG. 2 is a data structure diagram showing an example of order information according to the first embodiment.

FIG. 3 is a data structure diagram showing an example of data amount information according to the first embodiment.

FIG. 4 is a data structure diagram showing an example of threshold information according to the first embodiment.

FIG. 5 is a graph showing an example of relationship among a write order, a valid data amount and a threshold.

FIG. 7 is a block diagram showing of an example of a detail structure of an information processing system according to a second embodiment.

FIG. 8 is a perspective view showing an example of a storage system according to the second embodiment.

DETAILED DESCRIPTION

Figure 6:
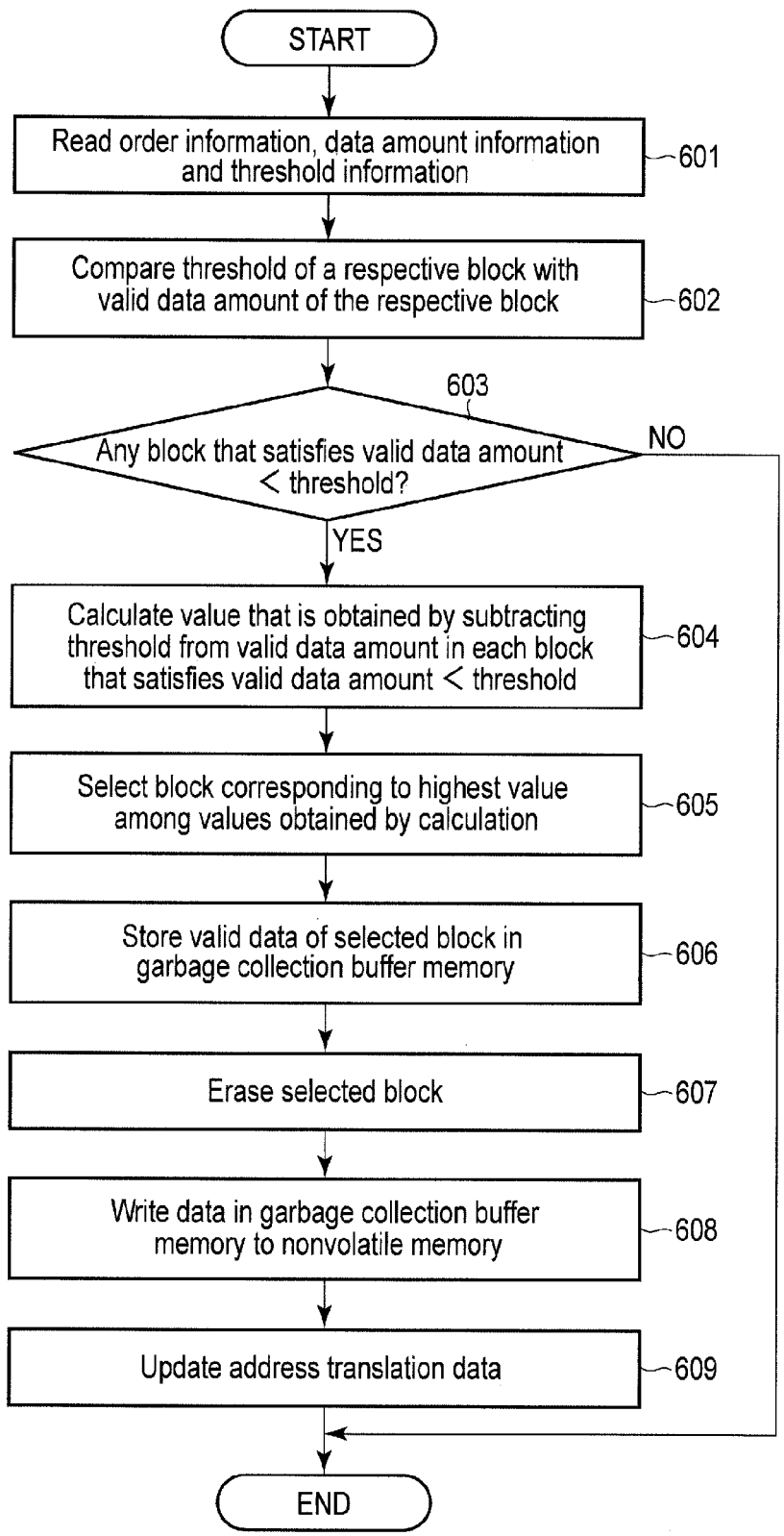
FIG. 6 is a flowchart showing an example of garbage collection processing executed in the memory system according to the first embodiment.

In general, according to one embodiment, a memory system includes a nonvolatile memory, a detection unit, a management unit, a selection unit, and a garbage collection unit. The nonvolatile memory includes memory areas divided into units of execution of garbage collection. The detection unit detects a data amount of data written to a different memory area among the memory areas when the garbage collection is executed, for each of the memory areas. The management unit manages a threshold set for each of the memory areas. The selection unit selects, based on the data amount and the threshold for each of the memory areas, a memory area whose data amount is smaller than the threshold of the memory area. The garbage collection unit executes the garbage collection on the memory area selected by the selection unit.

Embodiments will be described hereinafter with reference to drawings. In a following description, the same reference numerals denote components having nearly the same functions and arrangements, and a repetitive description thereof will be given if necessary.

First Embodiment

A first embodiment explains a memory system for selecting a memory area wherein garbage collection is executed.

The memory system according to the present embodiment may be a memory system, such as an SSD. However, the same configuration as that of the memory system of the present embodiment is applicable to various types of memory devices, such as a memory card, an HDD, a hybrid memory device including the HDD and the SSD, and an optical disk.

The memory system includes a nonvolatile memory. In the present embodiment, a description will be given of a case where the nonvolatile memory includes a NAND flash memory. However, the nonvolatile memory may include another type memory, other than the NAND flash memory, such as a NOR-type flash memory, a magnetoresistive random access memory (MRAM), a phase-change random access memory (PRAM), a resistive random access memory (ReRAM) or a ferroelectric random access memory (FeRAM).

In the nonvolatile memory of the present embodiment, data is erased collectively in each erasure-unit area. The erasure-unit area includes a plurality of write-unit areas and a plurality of read-unit areas. When the nonvolatile memory is a NAND flash memory, the erasure-unit area corresponds to a block. Each of the write-unit area and the read-unit area corresponds to a page.

In the present embodiment, access refers to both writing and reading for a memory.

In the present embodiment, memory areas are areas divided into units of execution of, for example, garbage collection. For example, the unit of execution of the garbage collection refers to a range of the memory as a target of execution of the garbage collection. More specifically, the unit of execution of the garbage collection is a range as a target of release of an unnecessary area executed by one garbage collection. For example, the unit of execution of the garbage collection may be one or more erasure-unit areas including a plurality of write-unit areas. In the present embodiment, it is assumed that the memory area is a block. However, the memory area may be defined as another unit, for example, may include two or more blocks.

FIG. 1 is a block diagram showing an example of an information processing system according to the present embodiment.

An information processing system 1 includes an information processing device 2 and a memory system 3. In the present embodiment, the information processing device 2 operates as a host device corresponding to the memory system 3.

The memory system 3 may be built in the information processing device 2, or the information processing device 2 may be connected to the memory system 3 by, for example, a network so that the information processing device 2 and the memory system 3 can communicate with each other. The memory system 3 may be connected to the information processing devices 2 so that the memory system 3 and the information processing devices 2 can communicate with each other. A plurality of memory systems 3 may be connected to one or more information processing devices 2 so that the memory systems 3 and one or more information processing devices 2 can communicate with each other.

The memory system 3 includes a controller 4 and a nonvolatile memory 5.

The nonvolatile memory 5 includes a plurality of blocks $B_0$ to $B_N$.

The controller 4 includes an interface unit 6, storage units 7A and 7B, a processor 8 and a memory controller 9. The controller 4 may be divided into a front end as a portion dependent on an interface for transmitting and receiving data, information, signal, command, address, etc., to and from, for example, the information processing device 2, and a back end independent of the interface. In this case, the front end includes, for example, the interface unit 6. The back end includes, for example, storage units 7A and 7B, the processor 8 and the memory controller 9.

The interface unit 6 transmits and receives data, information, signal, command, address, etc., to and from an external device, such as the information processing device 2.

The storage unit 7A stores a program 71 executed by the processor 8, address translation data 72, order information 73, data amount information 74, and threshold information 75. Part or all of the program 71, the address translation data 72, the order information 73, the data amount information 74 and the threshold information 75 may be stored in other memories, such as a memory in the processor 8, or may be written to the nonvolatile memory 5. The program 71 may be, for example, firmware, an application program, or an operating system. The address translation data 72 associates a logical address of write data received from the information processing devices 2 with a corresponding physical address in the storage unit 7B or in the nonvolatile memory 5. The address translation data 72 is, for example, a look-up table (LUT). The address translation data 72 may have a data structure of a table form, or may associate the logical address with the physical address using a list structure.

The storage unit 7A is, for example, a nonvolatile memory. However, part or all of the storage unit 7A may be a volatile memory, such as a dynamic random access memory (DRAM or a static random access memory (SRAM). When the storage unit 7A includes a volatile memory, a program or data stored in the volatile memory may be written to a nonvolatile memory, such as the nonvolatile memory 5, upon interruption of power supply to the memory system 3.

The storage unit 7B is used as, for example, a work memory. The storage unit 7B includes a write buffer memory WB and a garbage collection buffer memory GB.

The write buffer memory WB temporarily stores write data received from the information processing devices 2. The garbage collection buffer memory GB temporarily stores data (valid data) in garbage collection described later.

The storage unit 7B may be a volatile memory, a nonvolatile memory, or a combination of the nonvolatile memory and the volatile memory.

The memory controller 9 receives data, information, signal, command, address, etc., from various modules, such as the processor 8 and storage unit 7B, and executes writing, reading and erasure for the nonvolatile memory 5.

The processor 8 totally controls the memory system 3. The processor 8 functions, by executing the program 71, as a write unit 81, an address translation unit 82, an order management unit 83, a detection unit 84, a threshold management unit 85, a selection unit 86 and a garbage collection unit 87. In the present embodiment, part or all of the write unit 81, the address translation unit 82, the order management unit 83, the detection unit 84, the threshold management unit 85, the selection unit 86 and the garbage collection unit 87 may be installed as hardware in the memory system 3.

The processor 8 receives a command, logical address, information designating data size, and write data from the information processing device 2 via the interface unit 6.

When a write command is received, the write unit 81 stores write data into the write buffer memory WB.

When write data of a data amount suitable for writing to the nonvolatile memory 5 is stored in the write buffer memory WB, the write unit 81 writes the data in the write buffer memory WB to the nonvolatile memory 5 via the memory controller 9.

When write data is stored in the write buffer memory WB, the address translation unit 82 updates the address translation data 72 by associating the logical address of the write data with the physical address of a portion of the write buffer memory WB that stores the write data.

Further, when the data in the write buffer memory WB is written to the nonvolatile memory 5, the address translation unit 82 updates the address translation data 72 by associating the logical address of the data with the physical address of a portion of the nonvolatile memory 5 to which the data is written.

Furthermore, when data in the nonvolatile memory 5 is shifted by garbage collection, the address translation unit 82 updates the address translation data 72 by associating the logical address of the shifted data with a physical address of a destination of the shifted data based on the garbage collection.

The order management unit 83 manages the order information 73 that designates an order of writing of the blocks $B_0$ to $B_N$. For instance, the order management unit 83 stores, in storage unit 7A, the order information 73 in which ascending sequential numbers designating the order of writing are allocated to identification information items of the blocks $B_0$ to $B_N$.

The detection unit 84 detects the data amounts of valid data (hereinafter, referred to as the valid data amounts) corresponding to respective blocks $B_0$ to $B_N$, and stores, in storage unit 7A, data amount information 74 obtained by allocating the valid data amounts to the respective identification information items of the blocks $B_0$ to $B_N$.

Assume here that the valid data refers to data that is available at the least. In the present embodiment, assume, for example, that the valid data is data written in a block that is included in the blocks of the nonvolatile memory 5 and excludes a block where garbage collection has been executed.

More specifically, the valid data is data to be referred to by, for example, the address translation data 72. The valid data is, as an example, data, for which the memory system 3 does not receive an overwrite command designating a logical address from the information processing device 2 after receiving, from the information processing device 2, the logical address and write data corresponding to the logical address, along with a write command. In other words, assume, for example, that the valid data is newest data when data corresponding to the same logical address is stored in or written to a plurality of positions.

In contrast, assume that invalid data is data that is unavailable at the least. In the present embodiment, invalid data refers to data that is not necessary to be written in a block other than a block where garbage collection has been executed, but may be erased. The invalid data may be, for example, data before an update after the update occurs.

In the present embodiment, the amount of the valid data for each of the blocks $B_0$ to $B_N$ corresponds to, for example, the size of all valid data in each of the blocks $B_0$ to $B_N$. For instance, if a plurality of valid data items have the same size, the valid data amount for each of the blocks $B_0$ to $B_N$ may be managed based on the number of the valid data items in each of the blocks $B_0$ to $B_N$.

The threshold management unit 85 manages thresholds set for respective blocks $B_0$ to $B_N$. For instance, the threshold management unit 85 stores, in storage unit 7A, the threshold information 75 obtained by allocating, to the identification information items of the blocks $B_0$ to $B_N$, respective thresholds to be referred to when it is determined whether garbage collection should be executed. For example, based on the order information 73, the threshold management unit 85 sets the respective thresholds for the blocks $B_0$ to $B_N$ so that the threshold for a block earlier in write order (i.e., an earlier written block) is greater than the threshold for a block later in write order (i.e., a later written block). A part of the thresholds may be equal.

Based on the data volume information 74 and the threshold information 75, the selection unit 86 determines whether the valid data amount is smaller than a threshold for each block $B_0$ to $B_N$, and selects, as a garbage collection target, a block whose valid data amount is smaller than the threshold.

For instance, the selection unit 86 may calculates values obtained by subtracting the valid data amounts of the blocks $B_0$ to $B_N$ from the thresholds of the blocks $B_0$ to $B_N$, respectively, and selects, as the garbage collection target, a block corresponding to the greatest value among the calculated values corresponding to respective blocks $B_0$ to $B_N$.

For instance, the selection unit 86 may calculates values obtained by subtracting the valid data amounts of the blocks $B_0$ to $B_N$ from the thresholds of the blocks $B_0$ to $B_N$, respectively, groups the blocks $B_0$ to $B_N$ in accordance with the calculated values corresponding to respective blocks $B_0$ to $B_N$, and selects a block as the garbage collection target from the group of the highest value. More specifically, the selection unit 86 may subtract the valid data volumes of blocks $B_0$ to $B_N$ from the thresholds of blocks $B_0$ to $B_N$, respectively, selects a block corresponding to a value that is included in the calculated values corresponding to respective blocks $B_0$ to $B_M$ and is not less than a set value that allows execution of garbage collection.

The selection unit 86 may select one block or a plurality of blocks.

The garbage collection unit 87 executes garbage collection on a block selected by the selection unit 86. In the present embodiment, the garbage collection may be processing of releasing unnecessary area from the memory. More specifically, the garbage collection unit 87 temporarily stores, in the garbage collection buffer memory GB, the valid data in a block selected from the nonvolatile memory 5 by the selection unit 86, erases the selected block, selects, from the nonvolatile memory 5, a free area as a destination of shift of valid data, and writes the valid data in the garbage collection buffer memory GB to the selected free area. The free area refers to a data-writable area. A free block is regarded as an example of the free area. The free block is a block from which data is erased and to which no valid data is written.

When the nonvolatile memory 5 is a NAND flash memory, the valid data of a block as a garbage collection target is shifted to another block, and the block as the garbage collection target is erased, in order to release an unnecessary area in the memory. Accordingly, when the nonvolatile memory 5 is a NAND flash memory, compaction may be executed along with the garbage collection. In the present embodiment, the garbage collection unit 87 may be replaced with a compaction unit that executes compaction. The compaction refers to processing of collecting unnecessary areas in the memory and increasing a continuous area in which data is writable. The compaction unit temporarily stores, in the storage unit 7B, valid data in a plurality of blocks selected by the selection unit 86, and writes, into a selected free area, the valid data temporarily stored in the storage unit 7B.

FIG. 2 is an information structure diagram showing an example of the order information 73 according to the present embodiment.

The order information 73 associates identification information items in the blocks $B_0$ to $B_N$ with the sequential ascending numbers that designate a write order.

In FIG. 2, writing is executed in order of the blocks $B_0$ to $B_N$. A number K is associated with the block $B_0$, a number K+1 is associated with the block $B_1$, and a number K+N is associated with the block $B_N$.

From the order information 73, it can be recognized that the newest writing has been executed to the block $B_N$ associated with the maximum number K+N.

Further, a difference between the maximum number K+N and the number K associated with the block $B_0$ is N, and a difference between the maximum number K+N and the number K+1 associated with the block $B_1$ is N−1. Thus, it can be recognized that data was written to the block $B_0$ where the difference is relatively large, before writing to the block $B_1$ where the difference is relatively small.

In the order information 73, the write order may be managed using information other than the ascending numbers. For example, in the order information 73, the identification information items of the blocks $B_0$ to $B_N$ may be associated with time information designating times at which writing occurred.

FIG. 3 is an information structure diagram showing an example of the data amount information 74 according to the present embodiment.

In the data amount information 74, the identification information items of the blocks $B_0$ to $B_N$ are associated with valid data amounts (the total sizes of valid data) $Z_0$-$Z_N$, respectively. In general, the earlier the write order of a block, the smaller the amount of valid data.

FIG. 4 is an information structure diagram showing an example of the threshold information 75 according to the present embodiment.

In the threshold information 75, the identification information items of the blocks $B_0$ to $B_N$ are associated with thresholds $TH_0$ to $TH_N$ to be compared with valid data amounts $Z_0$ to $Z_N$, respectively. The thresholds $TH_0$ to $TH_N$ are set such that the earlier the write order of the block, the higher the threshold associated with the block, and the later the write order of the block, the lower the threshold associated with the block. In the present embodiment, since writing are executed in the order of the blocks $B_0$ to $B_N$, the thresholds associated with the blocks $B_0$ to $B_N$ have a relationship $TH_0 > TH_1 > TH_2 > \ldots > TH_N$. However, a part of thresholds $TH_0$ to $TH_N$ may be equal.

FIG. 5 is a graph showing an example of relationship among the write order, the valid data amount and the threshold.

In FIG. 5, writing is executed in order of blocks $B_0$ to $B_N$. In general, the later a write order of a block, the larger a valid data amount of the block, compared to a block whose write order is earlier. However, the valid data amount is influenced by a state of use of the memory system 3. Therefore, there is a case where even if a write order of a block is earlier, a valid data amount of the block is greater than a valid data amount of a block whose write order is later.

The threshold of a block whose write order is earlier is set to a value which is larger than a threshold set for a block whose write order is later. However, partially, the threshold of the block whose write order is earlier may be set to a value which is equal to the threshold set for the block whose write order is later.

In FIG. 5, in the blocks $B_0$ to $B_3$, the valid data amounts $Z_0$ to $Z_3$ are smaller than the thresholds $TH_0$ to $TH_3$, respectively. In view of this, Values (differences) $D_0$ to $D_3$ are calculated by subtracting the valid data amounts $Z_0$ to $Z_3$ of the blocks $B_0$ to $B_3$ from the thresholds $TH_0$ to $TH_3$ of the blocks $B_0$ to $B_3$, respectively.

As a result of the calculation, it is detected that the value $D1$ of the block $B_1$ is higher than the values $D_0$, $D_2$ and $D_3$ of the other blocks $B_0$, $B_2$ and $B_3$.

Therefore, when the blocks have such a relationship as shown in FIG. 5, the block B1 is selected as a garbage collection target block.

FIG. 6 is a flowchart showing an example of the garbage collection processing executed in the memory system 3 according to the present embodiment.

In step 601, the selection unit 86 reads the order information 73, the data amount information 74 and the threshold information 75 from the storage unit 7A.

In step 602, the selection unit 86 compares the thresholds $TH_0$ to $TH_N$ of the blocks $B_0$ to $B_N$ with the valid data amounts $Z_0$ to $Z_N$ of the blocks $B_0$ to $B_N$, respectively.

In step S603, the selection unit 86 determines whether there is a block whose valid data amount is smaller than a corresponding threshold of the block.

If there is no block whose valid data amount is smaller than the threshold, processing is finished.

If there is a block whose valid data amount is smaller than the threshold, the selection unit 86 calculates, in step 604, a value obtained by subtracting the threshold of the block, whose valid data amount is smaller than the threshold, from the valid data amount of the block.

In step 605, the selection unit 86 selects, as a garbage collection target block, a block corresponding to the largest value among obtained values.

In step 606, the garbage collection unit 87 reads the valid data of the selected block via the memory controller 9, and stores the read valid data in the garbage collection buffer memory GB.

In step 607, the garbage collection unit 87 erases the block selected via the memory controller 9.

In step 608, the garbage collection unit 87 writes the data, held by the garbage collection buffer memory GB, to any of the blocks in the nonvolatile memory 5 via the memory controller 9.

In step 609, the address translation unit 82 updates the address transmission information 72 by associating a logical address and a physical address of the valid data written to the nonvolatile memory 5 by the garbage collection unit 87.

In the present embodiment described above, garbage collection can be executed on a block in which no write occurs during a certain period of time, and there is a small amount of valid data.

For instance, if garbage collection is executed to a block with much valid data even though the write order of the block is earlier, the number of data items, which are required to be shifted, increases, and hence the garbage collection may not be executed efficiently.

In the present embodiment, however, garbage collection can be executed to a block whose write order is relatively earlier, and whose valid data amount is small, whereby the efficiency of the garbage collection can be enhanced in accordance with the state of use of the memory system 3.

Second Embodiment

In the present embodiment, an example of a detail structure of the information processing system 1 explained in the first embodiment is explained.

FIG. 7 is a block diagram showing of an example of a detail structure of the information processing system 1 according to the present embodiment.

The information processing system 1 includes the information processing device 2 and the memory system 3.

The processor 8 of memory system 3 according to the first embodiment corresponds to a Central processing unit (CPU) 43F and 43B.

The interface unit 6 corresponds to a host interface 41.

The memory unit 7A corresponds to a DRAM 47.

The address translation data 72 correspond to an LUT 45.

The memory controller 9 is a NAND controller (NANDC) 50.

The information processing device 2 functions as a host device of the memory system 3.

The controller 4 of the memory system 3 includes a front end FE and a back end BE.

The front end (host communication unit) FE includes a host interface 41, host interface controller 42, encode/decode unit (Advanced Encryption Standard (AES)) 44, and CPU 43F.

The host interface 41 communicates with the information processing device 2 to exchange a request (write command, read command, or erase command), LBA, and data.

The host interface controller (control unit) 42 controls the communication of the host interface 41 based on control of the CPU 43F.

The encode/decode unit 44 encodes write data (plaintext) transmitted from the host interface controller 42 in a data write operation. The encode/decode unit 44 decodes encoded read data transmitted from the read buffer memory RB of the back end BE in a data read operation. Note that the transmission of the write data and read data can be executed without using the encode/decode unit 44 as necessary.

The CPU 43F controls the above components 41, 42, and 44 of the front end FE to control the whole function of the front end FE.

The back end (memory communication unit) BE includes a write buffer memory WB, garbage collection buffer memory GB, read buffer memory RB, LUT 45, DDRC 46, DRAM 47, DMAC 48, ECC 49, randomizer RZ, NANDC 50, and CPU 43B.

The write buffer memory (write data transfer unit) WB stores the write data transmitted from the information processing device 2 temporarily. Specifically, the write buffer memory WB temporarily stores the write data until it reaches to a predetermined data size suitable for the nonvolatile memory 5.

The read buffer memory (read data transfer unit) RB stores the read data read from the nonvolatile memory 5 temporarily. Specifically, the read buffer memory RB rearranges the read data to be the order suitable for the information processing device 2 (the order of the logical address LBA designated by the information processing device 2).

The garbage collection buffer memory GB temporarily stores data at a garbage collection.

The LUT 45 is a table to translate a logical address LBA into a physical address PBA.

The DDRC 46 controls double data rate (DDR) in the DRAM 47.

The DRAM 47 is a nonvolatile memory which stores, for example, the LUT 45.

The direct memory access controller (DMAC) 48 transfers the write data and the read data through an internal bus IB. In FIG. 7, only a single DMAC 48 is shown; however, the controller 4 may include two or more DMACs 48. The DMAC 48 may be set in various positions inside the controller 4 as necessary.

The ECC (error correction unit) 49 adds an error correction code (ECC) to the write data transmitted from the write buffer memory WB. When the read data is transmitted to the read buffer RB, the ECC 49, if necessary, corrects the read data read from the nonvolatile memory 5 using the added ECC.

The randomizer RZ (or scrambler) disperses the write data in such a manner that the write data are not biased in a certain page or in a word line direction of the nonvolatile memory 5 in the data write operation. By dispersing the write data in this manner, the number of write can be standardized and a cell life of a memory cell MC of the nonvolatile memory 5 can be prolonged. Therefore, the reliability of the nonvolatile memory 5 can be improved. Furthermore, the randomizer RZ executes inverse, in the data read operation, processing of randomize processing at writing, and reconstructs original data.

The NAND controller (NANDC) 50 uses a plurality of channels (four channels CH0 to CH3 are shown in the Figure) to access the nonvolatile memory 5 in parallel in order to satisfy a demand for a certain speed.

The CPU 43B controls each component above (45 to 50, and RZ) of the back end BE to control the whole function of the back end BE.

A protocol used for communication between the memory system 3 and the information processing device 2 may be, for example, a serial Attached SCSI (SAS), PCI Express (PCIe), NVM Express (NVMe), Advanced Host Controller Interface (AHCI), etc. For example, data may be communicated in the memory system 3 according to the NVMe interface.

Note that the structure of the controller 4 shown in FIG. 7 is an example and no limitation is intended thereby.

FIG. 8 is a perspective view showing an example of a storage system according to the present embodiment.

A storage system 100 includes the memory system 3 as an SSD.

The memory system 3 is, for example, a relatively small module. Note that the size and scale of the memory system 3 is not limited thereto and may be changed into various sizes arbitrarily.

Furthermore, the memory system 3 may be applicable to the information processing device 2 as a server used in a data center or a cloud computing system employed in a company (enterprise) or the like. Thus, the memory system 3 may be an enterprise SSD (eSSD).

The memory system 3 includes a plurality of connectors (for example, slots) 101 opening upwardly, for example. The connectors 101 may be SAS connectors. When the connectors 101 are the SAS connectors, a high speed mutual communication can be established between the information processing device 2 and each memory system 3.

A plurality of memory systems 3 are individually attached to the connectors 101 of the information processing device 2 and supported in such an arrangement that they stand in an approximately vertical direction. Using this structure, a plurality of memory systems 3 can be mounted collectively in a compact size, and the memory systems 3 can be miniaturized. Furthermore, the shape of each memory system 3 according to the present embodiment is 2.5 inch small form factor (SFF). With this shape, the memory system 3 can be compatible with an enterprise HDD (eHDD) and the easy system compatibility with the eHDD can be achieved.

Note that the memory system 3 is not limited to the use in an enterprise HDD. For example, the memory system 3 can be used as a memory medium of a consumer electronic device such as a notebook portable computer or a tablet terminal.

As can be understood from the above, the information processing system 1 and the storage system 100 having the structure of the present embodiment can achieve a mass storage advantage with the same advantages of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory including first and second memory areas; and
a controller controlling the nonvolatile memory, the controller configured to:
detect data amounts of valid data written to the first memory area and data amounts of valid data written to the second memory area;
update, if writing for the second memory area is executed after writing for the first memory area, at least one of first and second thresholds such that the first threshold corresponding to the first memory area is greater than the second threshold corresponding to the second memory area;
select the first memory area as a memory area of a garbage collection target if the data amounts of the first memory area are smaller than the first threshold, and select the second memory area as the memory area of the garbage collection target if the data amounts of the second memory area are smaller than the second threshold; and
execute garbage collection on the selected memory area of the garbage collection target.

2. The memory system of claim 1, wherein
the first and second memory areas are two areas of memory areas included in the nonvolatile memory,
the first and second thresholds are two values of thresholds associated with the memory areas respectively,
the controller is further configured to manage order information including each of write orders for each of the memory areas, the write orders designating writing occurrence orders in which writing has occurred, and the updating by the controller includes setting, based on the order information, at least one of the first and second thresholds such that the first threshold is greater than the second threshold.

3. The memory system of claim 2, wherein the selecting by the controller includes calculating each of values obtained by subtracting each of data amounts for each of the memory areas from each of the thresholds for each of the memory areas, and selecting the memory area whose value is the greatest.

4. The memory system of claim 2, wherein the selecting by the controller includes calculating each of values obtained by subtracting each of data amounts for each of the memory areas from each of the thresholds for each of the memory areas, and selecting the memory area whose value is not less than a set value that allows execution of the garbage collection.

5. The memory system of claim 2, wherein the order information is information obtained by allocating ascending numbers designating each of the write orders for each of the memory areas.

6. The memory system of claim 5, wherein the updating by the controller includes identifying that the writing for the first memory area is earlier than the writing for the second memory area, based on that a difference between a newest number and a first number corresponding to the first memory area is greater than a difference between the newest number and a second number corresponding to the second memory area.

7. A memory system comprising:
a nonvolatile memory including a first memory area for which a first threshold is set and a second memory area for which a second threshold is set; and
a controller controlling the nonvolatile memory, the controller configured to:
update, if data is written to the second memory area after data is written to the first memory area, at least one of first and second thresholds such that the first threshold is greater than the second threshold; and
execute garbage collection on the first memory area if valid data amounts detected in the first memory area are smaller than the first threshold, and execute the garbage collection on the second memory area if valid data amounts detected in the second memory area are smaller than the second threshold.

* * * * *